W. ERDMANN.
FLY NET.
APPLICATION FILED SEPT. 24, 1910.

1,171,508.

Patented Feb. 15, 1916.
2 SHEETS—SHEET 1.

WITNESSES.

INVENTOR.
William Erdmann
By Benedict, Morsell & Caldwell
ATTORNEYS.

W. ERDMANN.
FLY NET.
APPLICATION FILED SEPT. 24, 1910.
1,171,508.
Patented Feb. 15, 1916.
2 SHEETS—SHEET 2.
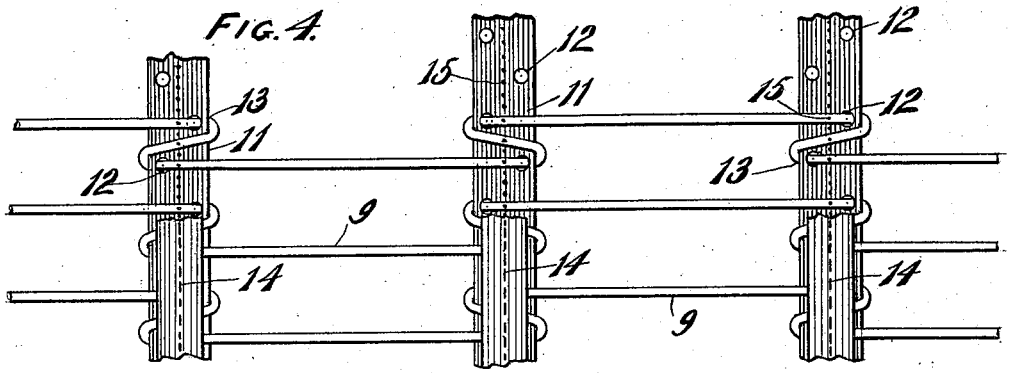
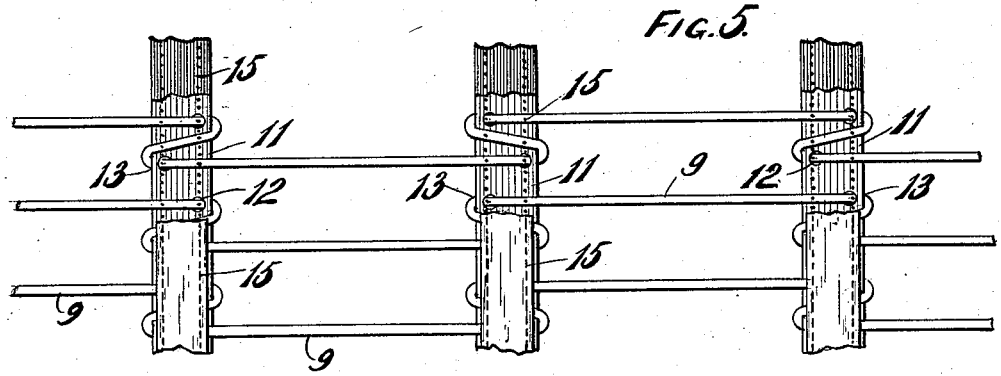
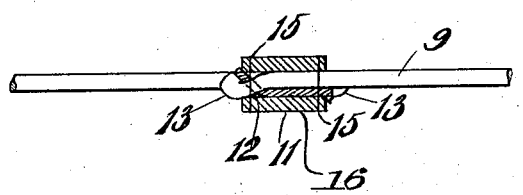
WITNESSES
INVENTOR
William Erdmann
By Benedict, Morsell & Caldwell
ATTORNEYS.

UNITED STATES PATENT OFFICE.

WILLIAM ERDMANN, OF MILWAUKEE, WISCONSIN, ASSIGNOR TO GEM HAMMOCK AND FLY NET COMPANY, A CORPORATION OF WISCONSIN.

FLY-NET.

1,171,508. Specification of Letters Patent. Patented Feb. 15, 1916.

Application filed September 24, 1910. Serial No. 583,596.

*To all whom it may concern:*

Be it known that I, WILLIAM ERDMANN, a citizen of the United States, residing in Milwaukee, in the county of Milwaukee and State of Wisconsin, have invented new and useful Improvements in Fly-Nets, of which the following is a description, reference being had to the accompanying drawings, which are a part of this specification.

This invention relates to improvements in fly nets for use on animals and is particularly directed to the means for securing the transverse cords or straps to the longitudinal bars.

One of the objects of this invention is to provide a fly net in which the transverse cords are interposed between double thicknesses of the longitudinal bars and looped and sewed therebetween by lines of stitches.

A further object of the invention is to provide a fly net in which the transverse cords are securely bound to the longitudinal bars in a simple and direct manner to form a strong and durable connection which is not liable to come apart.

With the above, and other objects in view the invention consists of the fly net and its parts and combinations as set forth in the claims, and all equivalents thereof.

Figure 1:
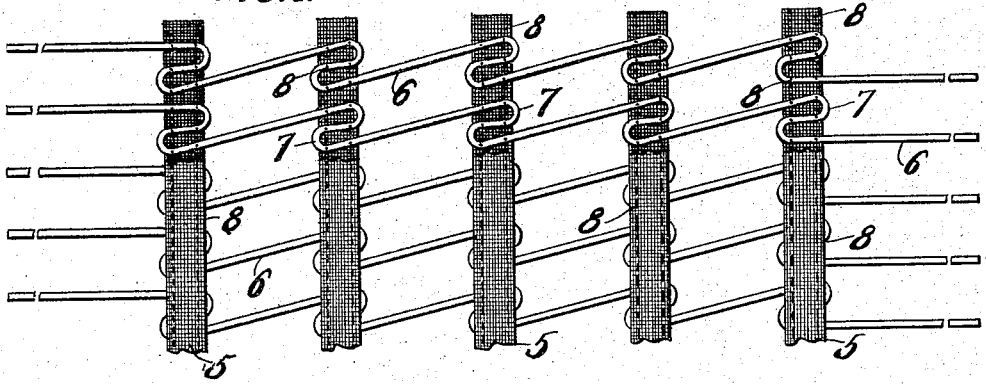
Figure 2:
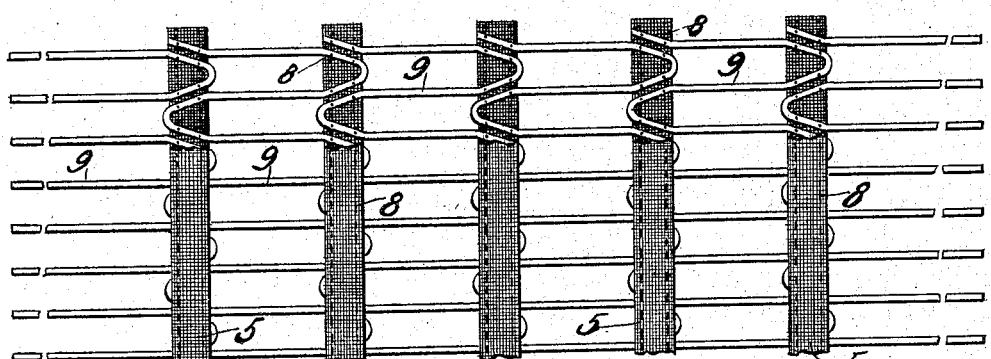
Figure 3:
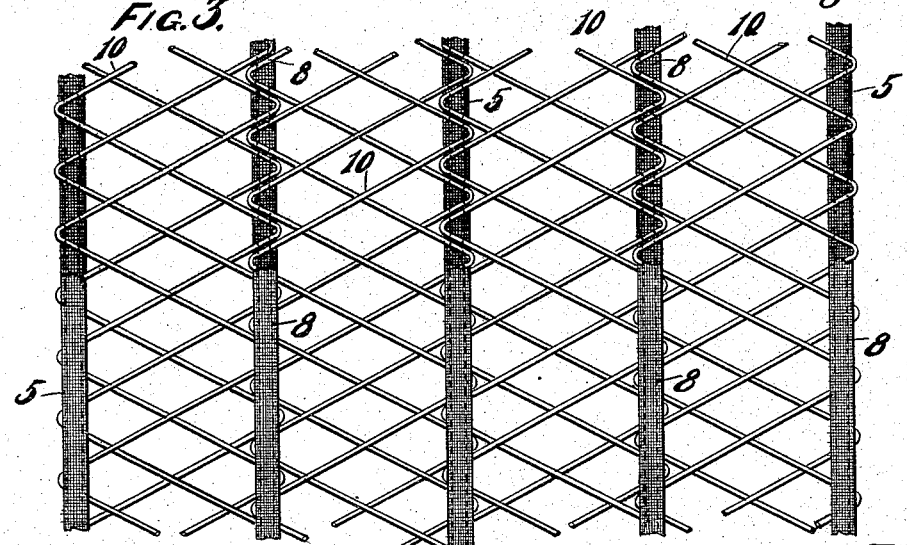

In the accompanying drawing in which the same reference characters indicate the same parts in all of the views: Figure 1 is a top view of a fragment of a fly net embodying the improvements, portions of the longitudinal bars being removed to show manner of fastening the cords to the bars; Fig. 2 is a similar view of a modified form of fly net; Fig. 3 is a similar view of another modified form of fly net; Fig. 4 is a similar view of another form of fly net; Fig. 5 is a similar view of still another form of fly net; and Fig. 6 is a transverse sectional view of one of the longitudinal bands shown in Fig. 5.

Referring to the drawing the numeral 5 indicates the two part longitudinal bars of a fly net to which transverse cords or strands 6 are connected. The two part longitudinal bars each consists of an upper and a lower strip of fabric between which the transverse cords extend. The cords are double looped or looped back and forth as indicated by the numeral 7 and extend from one longitudinal bar to another in straight parallel lines and are securely connected to the bars by longitudinal lines of stitches 8 which extend through the looped portions of the cords. This manner of fastening the transverse cords to the bars provides for the stitches passing through the cords at three points at each connection and if the cord at one point should by chance be looped by the stich line the loop of the cord would engage the stitch line between the cord loop and prevent the withdrawal of the cord from between the bars.

In the modified form shown in Fig. 2 the transverse cords or strands 9 extend back and forth between adjacent longitudinal bars with the loops of the cords extending between the two portions of each bar and positioned to alternate with the loops of other cords connected to other longitudinal bars. The loops of these cords are of V-shape in order to closely fit between adjacent loops and to give the appearance of the continuity of the transverse cords in extending from one side of the net to the other.

The modified form shown in Fig. 3 is somewhat similar to the last mentioned form with the exception that the transverse cords 10 extend at an angle and cross over each other and form a net like structure with meshes.

Both modified forms are connected to and between the portions of the longitudinal bars by the lines of stitches 8 in the same manner as described with reference to the principal form.

In the modified form shown in Fig. 4 the lower members of the two part longitudinal bars 11 are provided with perforations 12 and the transverse cords extend through the perforations and are looped around the side edges 13 of the bands. The upper members of the bars extend over the looped portions and a line of stitching 14 passing through both members of the longitudinal bars and also through the loops of the transverse cords serves to bind the parts securely together.

The modified form shown in Figs. 5 and 6 is similar in construction to the Fig. 4 form with the exception that the longitudinal bars are formed of three members sewed together by the lines of stitching 15. The lower member 16 is provided to cover the perforations and the looped portions of the transverse cords extending from the intermediate member.

From the foregoing description it will be seen that the transverse cords are securely fastened to the longitudinal bars and that the finished net presents an ornate appearance.

What I claim as my invention is:

1. A fly net, comprising pairs of longitudinal bars, one of the bars of each pair being provided with cord openings, transverse cords extending from one pair of bars to another and between the bars and through the openings of one of the bars of each pair of bars and partly around one of the bars and having double looped portions extending between the bars of each pair of bars, and lines of stitches extending longitudinally of the bars and through both bars of each pair of bars and through portions of the loops to bind the parts together.

2. A fly net, comprising pairs of longitudinal bars, one of said bars of each pair being provided with cord openings adjacent their edge portions, transverse cords extending from one pair of bars to another and between the bars of a pair and through the openings of one of the bars and around one side and both edges of the bar provided with the openings, said portions of the transverse cords extending between the bars of a pair of bars and partly around one of the bars forming double looped portions, and lines of stitches extending longitudinally of and through both bars of each pair of bars and through portions of the loops to bind the parts together.

In testimony whereof, I affix my signature, in presence of two witnesses.

WILLIAM ERDMANN.

Witnesses:
C. H. KEENEY,
LAURA A. KELLEY.

Copies of this patent may be obtained for five cents each, by addressing the "Commissioner of Patents, Washington, D. C."